Patented Sept. 22, 1931

1,824,676

UNITED STATES PATENT OFFICE

CHARLES MANNICH, OF BERLIN-STEGLITZ, GERMANY

ALDEHYDE BASE AND PROCESS FOR THE MANUFACTURE OF SAME

No Drawing. Application filed March 27, 1930, Serial No. 439,539, and in Germany June 25, 1928.

It has been found that aldehydes of the general formula

where R and R' represent hydrogen, alkyl radicals, a hydroaromatic ring of the general formula $C_nH_{2n}$, or compounds splitting off such aldehydes, may be condensed with formaldehyde and primary or secondary aliphatic amines to form amino-aldehydes according to the following equation:—

$$R\!\!>\!\!CH.CHO + H.CHO + HNR_2 = R\!\!>\!\!C\!\!<\!\!^{CHO}_{CH_2-NR_2} + H_2O.$$

The reaction proceeds favorably, if the hydrochloride of the amine with the aldehyde and an excess of formaldehyde in concentrated alcoholic solution are boiled for some time. Upon cooling the hydrochloride of the new aldehyde base generally crystallizes from the reaction product. The free aldehyde bases separated from the salts with solution of potassium hydroxide are colorless liquids with a strong alkaline reaction, which in vacuo may be distilled without decomposition. They are insoluble in water and very stable. With mineral acids they form crystalline salts which are readily soluble in water. By reduction the aldehyde bases are easily transformed into the respective alkamines.

The aldehyde bases are to be used as starting materials for the manufacture of medicines.

Example 1

17 parts by weight of isobutyl-aldehyde, 16 parts by weight of dimethylamine hydrochloride, 8 parts by weight of absolute alcohol and 9 parts by weight of paraformaldehyde are boiled for an hour under a reflux condenser while stirring vigorously. Then 9 parts by weight of paraformaldehyde are again added and the reaction product is boiled for another hour while stirring. The mixture gradually becomes homogeneous with the exception of an undissolved remnant of paraformaldehyde. When cooling a thick crystal mass is obtained which consists of α, α-dimethyl-β-dimethyl-amino prophyl-aldehyde hydrochloride. The free aldehyde base is a colorless oil boiling at 82° C. and 88 mm. pressure. The reaction is as follows:

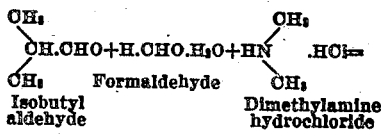

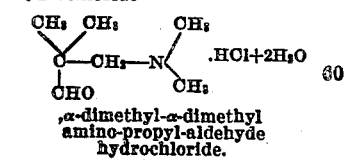

,α-dimethyl-α-dimethyl
amino-propyl-aldehyde
hydrochloride.

Example 2

595 parts by weight of isobutyl-aldehyde, 752 parts by weight of diethylamine hydrochloride, 315 parts by weight of paraformaldehyde and 500 parts by weight of absolute alcohol are boiled for two hours under a reflux condenser while stirring vigorously. Then again 315 parts by weight of paraformaldehyde are added and the boiling continued for 4 hours under a reflux condenser. Hereafter water is added, small quantities of neutral substances are removed by treatment with ether and the α, α-dimethyl-β-diethylamino-propyl-aldehyde, a colorless oil, separated by the addition of an excess of concentrated solution of potassium hydroxide. The base boils between 175 and 177° C. Its hydrochloride is very hygroscopic. The reaction is as follows:

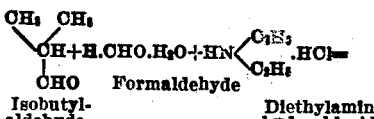

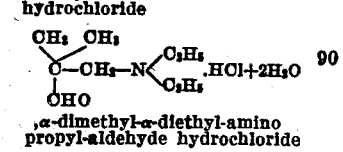

,α-dimethyl-α-diethyl-amino
propyl-aldehyde hydrochloride

Example 3

20 parts by weight of isobutyl-aldehyde, 24 parts by weight of piperidine, 8 parts by weight of absolute alcohol and 6 parts by weight of paraformaldehyde are boiled for half an hour under a reflux condenser while stirring vigorously. Then again 3 parts by weight of paraformaldehyde are added and the reaction product is kept boiling for 3 hours, until only a little paraformaldehyde remains undissolved. The reaction product is dissolved in water and in order to remove the excess of isobutyl-aldehyde shaken with ether. After addition of solution of potassium hydroxide the aldehyde base separates from the mixture; it distills at 95° C. and 12 mm. pressure. The α, α-dimethyl-β-piperidino-propyl-aldehyde is a colorless oil with a strong basic odor, which does not mix with water. The hydrochloride of the base crystallizes beautifully from acetone and melts at 164° C. The reaction is:

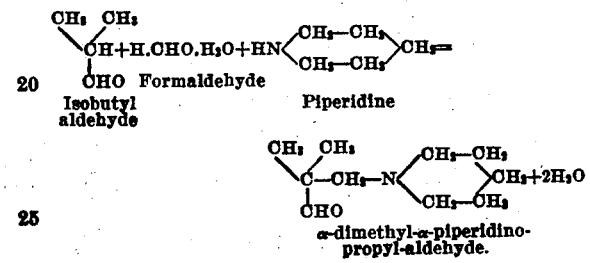

α-dimethyl-α-piperidino-propyl-aldehyde.

Example 4

15 parts by weight of isovaleryl-aldehyde, 21 parts by weight of dimethylamine hydrochloride, 25 parts by weight of formaldehyde solution (35%) are boiled for 3 hours under a reflux condenser, until the mixture has become homogeneous. The mixture, being of acid reaction, is shaken with ether; then an excess of solution of potassium hydroxide is added and by shaking with ether 20 parts by weight of a liquid base, α-isopropyl-β-dimethyl-amino-propyl-aldehyde, are obtained. It distills in form of a water-clear oil between 66 and 68° C. at 12 mm. pressure. The salts are hygroscopic. By reducing with sodium amalgam the respective alcohol base is easily obtained, which is an oil boiling at 85–86° C. and 15 mm. pressure. The reaction is:

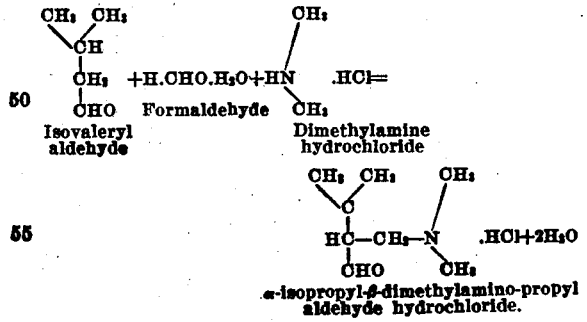

α-isopropyl-β-dimethylamino-propyl aldehyde hydrochloride.

Example 5

64 parts by weight of the bi-sulphite compound of hexahydro-benzaldehyde, 70 parts by weight of formaldehyde solution (35%), 40 parts by weight of piperidine hydrochloride, 0.75 parts by weight of concentrated hydrochloric acid and 12 parts by weight of alcohol are boiled for 3 to 4 hours under a reflux condenser. After some heating two layers are formed; by continued boiling and repeated shaking the upper layer gradually dissolves into the lower layer. When the oil swimming on the surface has completely disappeared, the product is filtered and the acid liquid treated with ether. The ether absorbs but little of the product. By the addition of an excess of solution of potassium hydroxide the aldehyde base, of oily consistency, is separated, taken up with ether and distilled in vacuo. The 1-(piperidino-methyl)-hexahydro-benzaldehyde boils at 141–142° C. and 12 mm. pressure and is a colorless oil. The hydrochloride of the aldehyde base crystallizes beautifully from acetone and melts at 165° C. The reaction is:

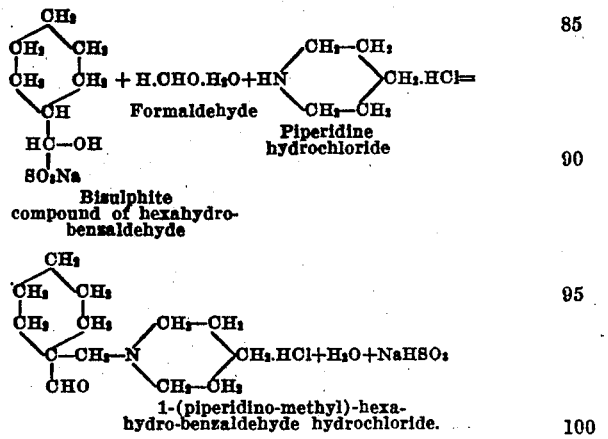

1-(piperidino-methyl)-hexahydro-benzaldehyde hydrochloride.

Example 6

24 parts by weight of methylamine hydrochloride, 14 parts by weight of paraformaldehyde are boiled with 36 parts by weight of isobutyl-aldehyde for 6–8 hours on a waterbath under a reflux condenser, the mixture being repeatedly shaken up, until a homogeneous liquid is obtained. When cooling a yellowish salt mass is formed consisting chiefly of the hydrochloride of α-(methylamino-methyl)-isobutyl-aldehyde. This raw product is sufficiently pure. In slightly acid solution it may be reduced with sodium amalgam to the respective alcohol base, α-(methyl-amino-methyl)-isobutyl-alcohol. The latter can be purified by distillation in vacuo, whereby it distills at 85° C. and 12 mm. pressure. The distilled alcohol base soon forms crystals, which are easily soluble in organic solvents and may be recrystallized from petroleum ether. Their melting point is 54° C.

Example 7

85 parts by weight of para-isobutyl-aldehyde, 80 parts by weight of dimethylamine hydrochloride, 300 parts by weight of formaldehyde solution (35%), 200 parts by weight of water and 1 part by weight of concentrated hydrochloric acid are boiled under a reflux condenser, until the layer of melted para-isobutyl-aldehyde swimming on the surface has almost disappeared; this requires several hours' boiling. When cool remnants of para-isobutyl-aldehyde are removed by shaking the acid liquid with ether and hereafter the aldehyde base is separated by the addition of concentrated solution of potassium hydroxide. The base boils at 145° C. at ordinary pressure. The reaction is as follows:

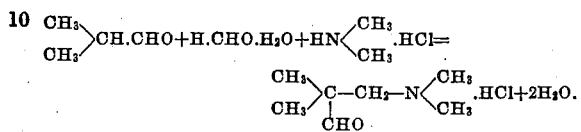

Example 8

7 parts by weight of dimethylamine hydrochloride, 10 parts by weight of water, 12 parts by weight of isobutyl-aldehyde-acetal and 15 parts by weight of formaldehyde solution (35%) are boiled under a reflux condenser for 10 hours. The layer of acetal, which at first swims on the surface, will then have dissolved. By treating the acid solution with ether small quantities of neutral substances are removed and then the aldehyde base, α, α-dimethyl-β-dimethylamino-propyl-aldehyde, is separated by the addition of an excess of concentrated solution of potassium hydroxide. The base boils between 142 and 144° C. The hydrochloride melts at 152–153° C. The reaction is:

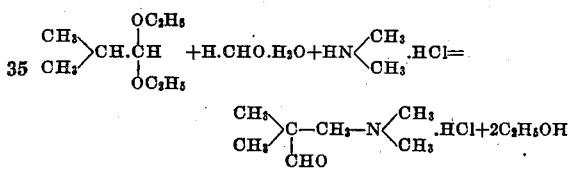

Example 9

11 parts by weight of diethylamine hydrochloride, 10 parts by weight of water, 12 parts by weight of isobutyl-aldehyde-acetal and 15 parts by weight of formaldehyde solution (35%) are boiled for 10 hours under a reflux condenser. The layer of acetal, which at first swims on the surface, will then have dissolved. By treating the acid solution with ether small quantities of neutral substances are removed and then the aldehyde base is separated by the addition of an excess of concentrated solution of potassium hydroxide, the said base being α, α-dimethyl-β-diethylamino-propyl-aldehyde, a colorless oil. The base boils at 175–177° C.; its hydrochloride is very hygroscopic.

Example 10

11 parts by weight of diethylamine hydrochloride, 5 parts by weight of water, 17 parts by weight of hexahydro-benzaldehyde-acetal and 12 parts by weight of formaldehyde solution (35%) are boiled for 10 hours under a reflux condenser while stirring vigorously. By treating the acid solution with ether neutral substances are removed, then solution of potassium hydroxide is added until alkaline reaction sets in, the basic products are taken up with ether and fractionally distilled in vacuo. The 1-(diethylamino-methyl)-hexahydro-benzaldehyde distills at 120–122° C. and 12 mm. pressure.

I claim:

1. As new product α, α-dimethyl-β-diethylamino-propyl-aldehyde, which is produced by treating isobutyl-aldehyde with formaldehyde and diethylamine, the new product being a colorless oil and boiling between 175–177° C., its hydrochloride being very hygroscopic.

2. Process for the manufacture of aldehyde bases, which consists in condensing aldehydes of the general formula

wherein R and R' denote hydrogen, alkyl radicals, or together form a hydro-benzene ring, with formaldehyde and aliphatic amines other than tertiary.

3. Process for the manufacture of aldehyde bases, which consists in condensing compounds splitting off aldehydes of the general formula

wherein R and R' denote hydrogen, alkyl radicals, or together form a hydro-benzene ring, with formaldehyde and aliphatic amines other than tertiary.

4. Process for the manufacture of aldehyde bases, which consists in condensing the acetals of the aldehydes of the general formula

wherein R and R' denote hydrogen, alkyl radicals, or together form a hydro-benzene ring, with formaldehyde and aliphatic amines other than tertiary.

5. Process for the manufacture of aldehyde bases, which consists in condensing aldehydes of the general formula

wherein R and R' denote hydrogen, alkyl radicals, or together form a hydro-benzene ring, with para-formaldehyde and aliphatic amines other than tertiary.

6. Process for the manufacture of aldehyde bases, which consists in condensing aldehydes of the general formula

wherein R and R' denote hydrogen, alkyl radicals, or together form a hydro-benzene ring, with formaldehyde and primary aliphatic amines.

7. Process for the manufacture of aldehyde bases, which consists in condensing aldehydes of the general formula

wherein R and R' denote hydrogen, alkyl radicals, or together form a hydro-benzene ring, with formaldehyde and secondary aliphatic amines.

8. Process for the manufacture of $\alpha, \alpha$-dimethyl-$\beta$-diethylamino-propyl-aldehyde which consists in condensing isobutyl-aldehyde with formaldehyde and diethylamine.

9. Process for the manufacture of $\alpha, \alpha$-dimethyl-$\beta$-diethylamino-propyl-aldehyde which consists in condensing isobutyl-aldehyde with paraformaldehyde and diethylamine.

10. A process for the manufacture of aldehyde bases, which consists in mixing aldehydes of the general formula

wherein R and R' denote hydrogen, alkyl radicals, or together form a hydro-benzene ring, with the hydrochloride of an aliphatic amine other than tertiary, formaldehyde, and concentrated alcohol, heating said mixture, cooling the heated mixture, whereby the hydrochloride of the aldehyde base separates, and separating the base with potassium hydroxide.

11. A new products, aldehyde bases having the general formula

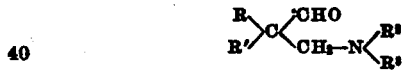

wherein R and R' denote hydrogen, alkyl radicals, or together form a hydro-benzene ring, and $R^2$ and $R^3$ denote hydrogen, alkyl radicals, or together form a piperidine ring, said bases being stable, colorless liquids with a strong alkaline reaction, and insoluble in water; forming crystalline, water soluble salts with mineral acids; and being easily reduced to alkamines.

In witness whereof I have hereunto set my hand.

CHARLES MANNICH.